Figure 1:
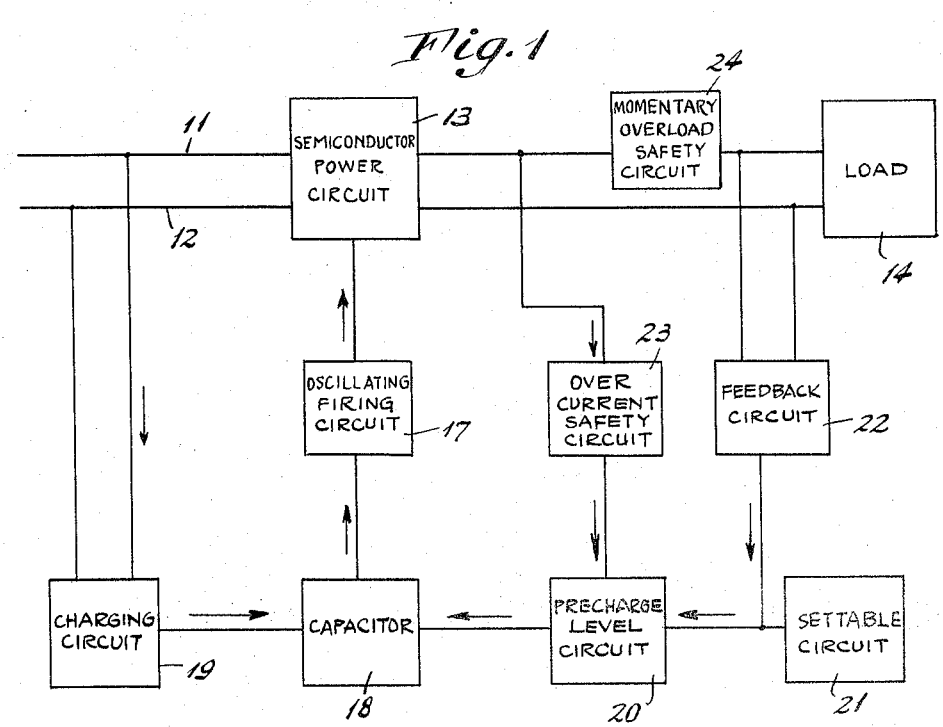

March 29, 1966 A. R. PERRINS 3,243,689
POWER CONTROL CIRCUIT
Filed Nov. 2, 1961 2 Sheets-Sheet 1

INVENTOR.
Allen R. Perrins
BY
Johnson and Kline
ATTORNEYS

United States Patent Office 3,243,689
Patented Mar. 29, 1966

3,243,689
POWER CONTROL CIRCUIT
Allen R. Perrins, Cheshire, Conn., assignor to The Superior Electric Company, Bristol, Conn., a corporation of Connecticut
Filed Nov. 2, 1961, Ser. No. 149,747
12 Claims. (Cl. 323—22)

The present invention relates to an electrical power control circuit employing semiconductor elements for modulating power to a load and more particularly to such a circuit which may be used to adjust and control the intensity of illumination of incandescent electric bulbs, by controlling the electrical power to the bulbs.

The illumination control of bulbs has heretofore been accomplished by many different electrical systems including adjustable transformers, magnetic amplifiers, power gas discharge tubes, etc. With the commercial availability of semiconductor power control elements of small size as compared to their power controlling ability, it has become desirable to employ such elements in an alternating current circuit in order to control the power to a load. However, these elements have inherent characteristics which present numerous problems which have heretofore prevented their complete acceptance. For example, one semiconductor power control element is a silicon controlled rectifier (SCR) and these SCR elements have been found to vary substantially in characteristics between each other which generally produces an unevenness of power conducting between the elements. Moverover, the elements have their characteristics altered by changes in ambient temperature and are susceptible to destruction by either large momentary current surges or sustained overloads. These factors and others accordingly have limited the use of devices of this type in power supply circuits and particularly in incandescent lamp circuits wherein the initial current flow is exceedingly large due to the initial low resistance of the lamps.

It is accordingly an object of the present invention to provide an electrical power control circuit employing semiconductor elements for controlling the power which is reliable and accurate in operation even over a wide range of ambient conditions.

A further object of the present invention is to provide a power circuit of the above type which does not require the elements to be critically matched and yet in which symmetrical firing or conduction thereof is effected.

Another object of the present invention is to provide for an electrical power control circuit that is capable of functioning with different sizes of semiconductor elements to thereby control different ranges of power from the input to a load and which also may fire a plurality of such elements, i.e. more than one for each half cycle of operation.

A further object of the present invention is to provide an electrical power control circuit using SCR elements that employs an overload circuit for preventing firing of the SCR elements upon an extended abnormal condition and which also protects the SCR elements during rapid changes in the current controlled.

In carrying out the present invention, the electrical power circuit of the present invention includes at least one semiconductor element (SCR) and since the specific embodiment hereinafter disclosed controls A.C. power, there are a pair of semiconductor elements, specifically silicon controlled rectifiers (SCR) connected to control both halves of the A.C. current between an input and a load. Each of the SCR elements is rendered conducting during one-half of the cycle of the alternating current and the length of time that each is conducting thereby controls the amount of power to the load. Accordingly for accurate control of the power, the present invention employs a firing circuit which produces relatively high frequency pulses and continues the pulses for the time when each SCR element is to be rendered conductive. In order to control the time or interval of the half cycle when the firing pulses occur, there is provided a settable circuit which sets the amount of power to be transmitted to the load together with a circuit for sensing the amount of power actually being delivered to the load. The output of these two circuits is combined in a precharge level circuit to effect the initial voltage charge on a condenser. Additionally effecting the voltage charge on the condenser is a charging circuit that supplies a voltage to the condenser that increases substantially linearly during each half cycle. Accordingly by controlling the initial voltage level by the two circuits and having a predetermined substantially linear charging voltage the voltage of the condenser will reach a desired voltage during each half cycle at a predetermined point of the cycle and this desired voltage is sufficient to actuate the firing circuit to produce the relatively high frequency pulses. The condenser, after each half cycle, is discharged and thus the initial or precharge voltage and the linear charging voltage function for each half cycle of alternating current power without being effected by the charge during the previous half cycle.

In the present power control circuit wherein the SCR elements would be damaged by large momentary increases in current, such as occur when the system is initially turned on and the load consists of cold incandescent lamps, the present invention includes a momentary overload safety device which may be of the type disclosed in my copending application, Serial No. 11,374, filed February 26, 1960, now Patent No. 3,099,789, issued July 30, 1963. Furthermore, to provide for continuous overload safety protection of the SCR elements, the present invention incorporates an overcurrent safety circuit which after a few cycles of alternating power above the selected value or after a great increase in current functions to prevent the precharge level circuit from precharging the condenser. This in conjunction with the linear charging circuit during each half cycle having a charging rate that is incapable of charging the condenser to the level necessary to activate the firing circuit, effectively stops conduction of the SCR elements and thus protects them from damage.

Other features and advantages will hereinafter appear.

Figure 2:
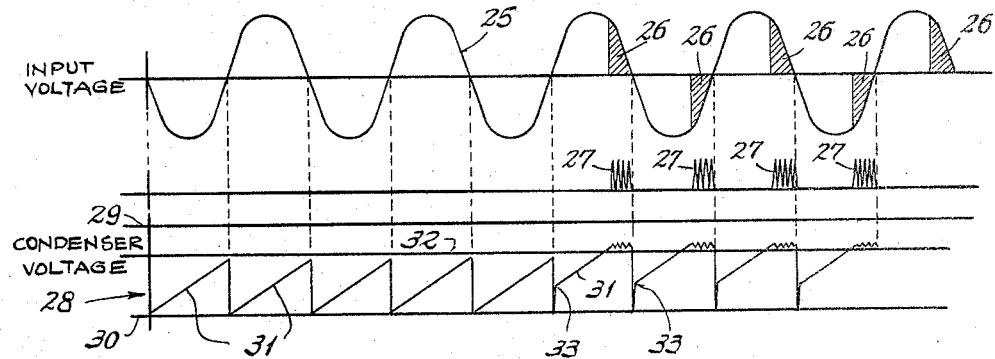
Figure 3:
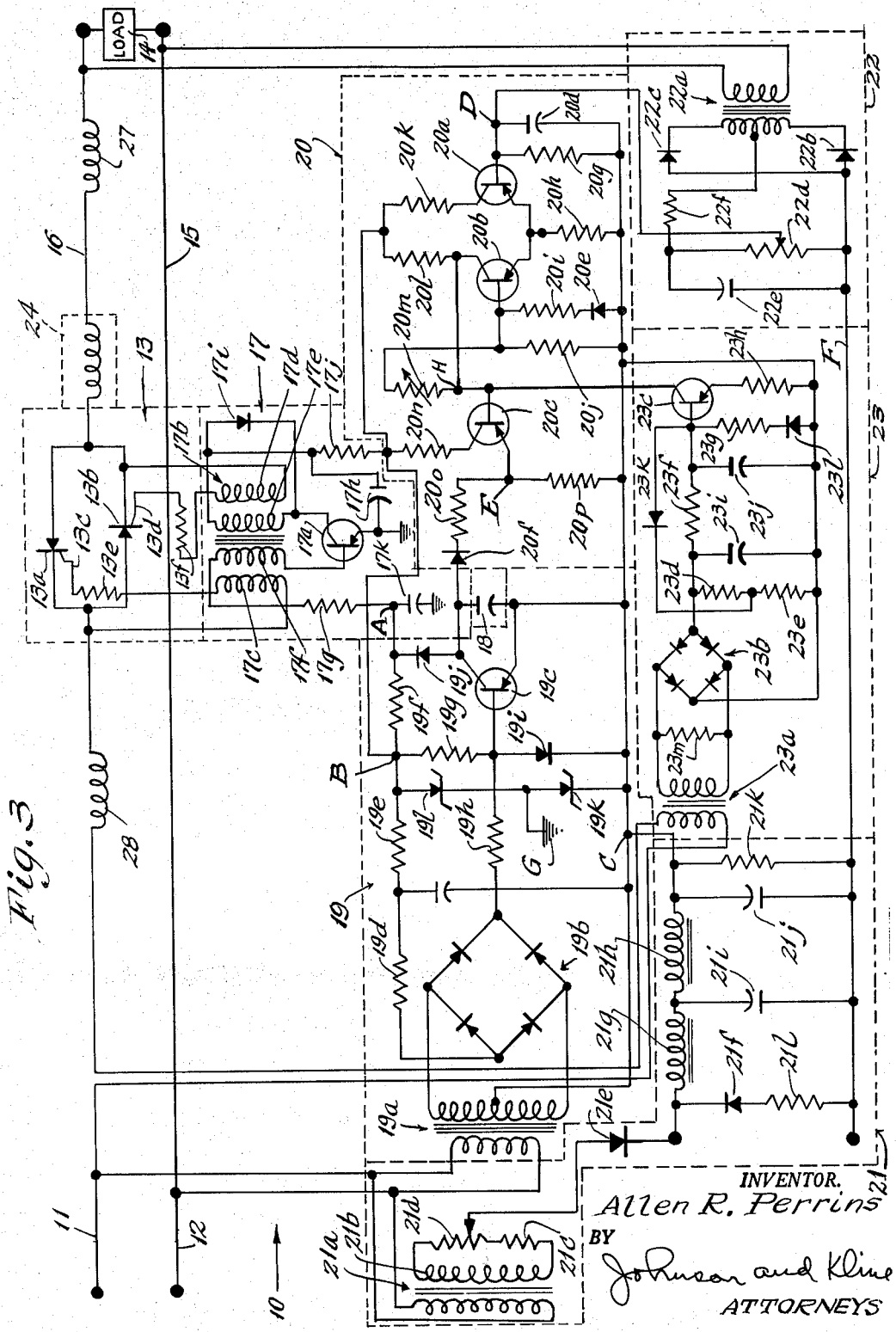

In the drawing:
FIGURE 1 is a block diagram of the A.C. power circuit of the present invention.
FIG. 2 is a diagrammatical representation of the voltages in various parts of the circuit.
FIG. 3 is an electric schematic diagram of the circuit.

Referring to the drawing, the circuit is generally indicated by the reference numeral 10 and includes input terminals 11 and 12 connectible to an alternating current power supply which is connected through the semiconductor power circuit, generally indicated by the reference numeral 13, to a load 14, which may be incandescent lamps, by output leads 15 and 16. Interconnected with the circuit 13 is an oscillating firing circuit 17 which produces high frequency firing pulses that fire or render conductive in the forward direction the semiconductor power circuit with the duration of the firing pulses per half wave of input determining the power supplied through the power circuit to the load 14. The firing circuit 17 normally produces no signal but is rendered operative to produce an oscillating signal for the power circuit 13 by the value of a voltage on a condenser 18 being at a predetermined value.

For charging the condenser 18 for each half cycle there is provided a charging circuit 19 that functions to both discharge the condenser 18 at the end of every half cycle of alternating input current and throughout the half cycle to substantially linearly increase the voltage of the condenser. However, the rate of charging for each half cycle is such that it is insufficient, by itself, to make the voltage of the condenser 18 be at the predetermined level that is necessary to cause the circuit 17 to produce the oscillating pulses to render conductive the power circuit 13. Accordingly in order to effect the value of the voltage on the condenser 18 to cause firing of the circuit 17, there is provided a precharge level circuit 20 which places on the condenser 18 an initial voltage precharge at the start of each half cycle which with the addition of the linear charging voltage from the linear charging circuit 19 increases the voltage to a value sufficient to fire the circuit 17.

The initial precharge level is determined by a settable circuit 21 which sets the voltage to be passed to the load 14 plus a feedback circuit 22 which senses the voltage across the load 14 and these two circuits are employed to adjust the value of the precharge voltage on the capacitor 18 to that required to fire the circuit 17 in order to have the power circuit 13 keep the set voltage on the load 14.

The present circuit requires that a precharge voltage be applied to the condenser 18 in order to effect firing of the circuit 17 and hence conduction of the power circuit 13. According to the present invention, if the current to the load is slightly greater than the rated current and exists for at least a few cycles of the A.C. input then the power circuit is rendered non-conductive. The power circuit is also rendered nonconducting when a great overload, such as five times rated current, flows to the load. This is effectively accomplished according to the present invention by providing an overload safety circuit 23 that prevents the precharge voltage from being applied by the circuit 20 to the condenser 18 and thus prevents the condenser 18 having a voltage charge that effects the firing of the circuit 17. After the elimination of the abnormal condition the safety circuit 23 reverts to its normal passive state of not effecting the precharge voltage. In addition to providing protection of the power circuit from sustained abnormal conditions, the circuit of the present invention effectively prevents large momentary overload current by a momentary overload circuit 24 connected in the output lead 16 that, for example, prevents damage to the power circuit elements. My above-noted copending application describes and claims one possible momentary overload circuit which may be employed.

In FIG. 2 are shown the voltages which are present at various parts of the power control circuit of the present invention. Thus the input voltage at the terminals 11 and 12 is shown by the sinusoidal curve 25 and the output voltage is shown by the hatched portions 26 thereof. Since there is output power only when the power circuit 13 is conductive, the oscillating firing circuit 17 produces, only during the output voltage portion 26, a high frequency signal indicated by the reference numeral 27. Located below the input curve 25 and positioned to be in timed relation therewith is a voltage curve 28 indicative of the voltage charge on the condenser 18 and having a zero value 29 and a negative value 30. The condenser by the linear charging circuit 19 initially starts at the negative value line 30 and is increased positively along a linear charging rate line 31 to a point below a central value line 32 provided it is desired to effect no conduction to the load. At the time corresponding with the change in direction of the input voltage, the condenser is discharged to line 30 and again starts to be charged positively on its linear charging rate curve. However, if it is desired to have power conducted to the load indicated by the shaded portions 26 then the precharge level circuit 20 effects precharging of the condenser after its discharge at the beginning of each half cycle to the value indicated by the point 33 when the linear charging rate starts and which continues until the voltage charge on the condenser 18 is slightly positive with respect to the central value line 32 at which time the condenser charge is sufficient to fire the circuit 17, producing the wave 27 and hence the output voltage 26. This occurs for each half cycle of the input voltage. If, however, it is desired to alter the power to the load then the manual control circuit 21 is adjusted and either increases or decreases the length of time for each half cycle that the condenser 18 is charged slightly positively with respect to the central value line 32. Naturally when the valve of the point 33 (the precharge level) is slightly positively above the line 32 then the power circuit is rendered conductive for the whole half cycle. A change in the value of the point 33 may also occur other than by a change in the settable circuit, if the load voltage being delivered is different from that which the settable circuit selects and hence the feedback circuit 22 will adjust the precharged level point 33.

Referring to FIG. 3, the schematical diagram of the present invention, the components of the individual circuits have been enclosed by dotted lines which have been given the same reference number as the circuits had in the block diagram of FIG. 1. In addition, the heretofore-mentioned components have on this figure the same reference number. In the power circuit 13, there are a pair of silicon controlled rectifiers (SCR) elements 13a and 13b connected conductively oppositely in parallel with the input lead 11 and the output lead 16. The gate leads 13c and 13d of the SCR elements each includes a resistor 13e and 13f respectively. In order to enable a man skilled in the art to practice the present invention, specific values and types of each of the components are hereinafter set forth but it will be understood that these values may change without departing from the scope of the present invention. Thus the SCR elements are C50B and while only one in each direction has been shown, the present invention may provide multiples thereof in either direction. The resistors 13e and 13f each has a value of 47 ohms.

The oscillating firing circuit 17 includes a transistor 17a (2N408) and a blocking oscillator transformer 17b having a secondary winding 17c connected to the gate resistor 13e and the lead 11 while another secondary winding 17d is connected to the resistor 13f and the lead 16. A primary winding 17e is connected to the collector of the transistor 17a while a feedback winding 17f connects to the base and to a resistor 17g (12 ohms). A condenser 17h (5.0 mfd.) connected to ground serves as a decoupling filter while a damping diode 17i (1N3193), a resistor 17j (47 ohms) and condenser 17k (0.1 mfd.) each connected in the manner shown completes the elements forming the oscillating firing circuit 17. This circuit 17 normally produces no signal in the primary winding 17e with a less negative voltage at the point A as the transistor is then reversely biased but as soon as the point A turns more negative, the emitter-base circuit of the transistor 17a is rendered conductive which renders the emitter-collector circuit conductive to produce in the secondary windings 17c and 17d a voltage signal indicated by voltage waves 27. In the embodiment shown, the voltage wave 27 has a frequency or repetition rate in the neighborhood of 10 kilocycles/seconds and its amplitude and pulse width are sufficient to fire the SCR elements 13a and 13b. The use of the transformer 17a electrically isolates the power to the load from the rest of the circuit in addition to providing the positive feedback in the emitter-base circuit to cause the oscillatory signal.

It will be appreciated that an oscillatory signal to fire the SCR elements insures the firing of the SCR units, even if more than one are employed in parallel and conductive in the same direction and that there is eliminated the effects of gradually increasing signals which may cause pre-firing or post firing of the SCR elements. The present oscillatory firing signal rises substantially instantaneously to a value sufficient to fire the SCR elements and when firing is not desired there is no signal. Moreover, the signal continues for the duration of the conduction of the SCR.

The capacitor linear charging circuit 19 includes the following components connected as schematically shown, a center-tapped step-down transformer 19a (2.4 to 1 ratio); rectifier bridge 19b, transistor 19c (2N408), resistor 19d (100 ohms), 19e (100 ohms), 19f (4.7K ohms), 19g (3.3K ohms), 19h (500 ohms); diode 19i (1N3193); diode 19j (1N3193) and Zener diodes 19k and 19l (both 1N3016).

In this circuit it will be appreciated that when the A.C. line voltage at the input terminals 11 and 12 is at zero, then the transistor 19c is fully conductive in its emitter-collector path which serves to discharge the condenser 18. Moreover, the diode 19i has a voltage across it which prevents the transistor from conducting except adjacent the zero points of the A.C. line frequency.

The values of the resistor 19f and the condenser 18 determine the linear charging rate of the condenser 18 by their RC time constant. It will moreover be appreciated that the rectifier 19b is not a normal full wave rectifier bridge but produces at the point B in conjunction with the Zener diodes a voltage which at all times has a value (12 volts approximately) that is negative with respect to the point (or lead) C and which is at all times negative (6 volts approximately) with respect to ground G.

It will accordingly be seen that the capacitor 18 is initially discharged to the value as indicated by zero line 29 (FIG. 2) with each zero crossing of the input power by conduction through the transistor 19c while non-conduction permits charging of the condenser at a substantially linear rate determined primarily by the resistor 19f. This rate is in itself insufficient for the charge on the condenser to go above the value indicated by the central value line 32. Moreover, the transistor 19c, by being fully conductive at the zero crossing, causes the condenser 18 to immediately be discharged to the level of the line 29. The linear charging circuit 19 obtains its input from the input terminals and hence is in timed relation therewith.

The precharge level circuit 20 includes transistors 20a, 20b and 20c (each 2N408); condenser 20d (40 mfd.); diode 20e (1N91); diode 20f (1N3193) and resistors 20g, 20h, 20i, 20j 20k, 20l, 20m, 20n, 20o, 20p having the following values respectively 1K, 82, 680, 2.7K, 1K, 4.7K, 25K (adjustable), 100, 22 and 1K ohms.

The precharge circuit accepts a signal, such as a voltage value, from the settable circuit 21 at the point C and a signal (also a voltage value) from the feedback circuit 22 at the point D with the difference in the two signals being amplified by the two transistors 20a and 20b (two being used as a differential amplifier balanced for temperature) to effect a change in the voltage across the resistor 20p between the points E and C by the emitter-follower circuit of the transistor 20c. Accordingly, the voltage across the resistor 20p is determined by the voltage at the point C and this voltage is the precharge voltage that is applied across the capacitor 18 after it has been discharged at the zero crossing of the input voltage. The diode 20f provides for precharging of the capacitor 18 but prevents clamping of the capacitor at the precharge voltage by the precharge circuit while the resistor 20o functions to limit precharge circuit during the discharge of the capacitor 18.

It will be appreciated that when the transistor 19c conducts to short circuit the capacitor 18, that it also short circuits the resistor 20p; however, the resistor 20o prevents the short circuit without significant time delay in view of its low value. The adjustable resistor 20m is employed to set the minimum precharge voltage, one that is insufficient when forming a base for the linear charging circuit to charge the condenser 18 to the value necessary to oscillate the firing circuit 17.

The settable circuit 21 includes a step-down transformer 21a having its secondary winding 21b connected across a resistor 21c (120 ohms) and a variable resistor 21d (500 ohms), diode 21e (1N3193), diode 21f (1N3193), filtering elements 21g, 21h, 21i (10 mfd.), and 21j (40 mfd.), resistor 21k (2.2K ohms) and resistor 21l (120 ohms). The variable potentiometer 21d and diode 21e provide a half wave rectified D.C. voltage which is filtered by the filtering elements 21g through 21j to provide an average value of the rectified D.C. voltage that is applied to the point C. By adjusting the value of potentiometer 21d, the relative value of the signal at the point D is changed which in turn changes the precharge level with consequent change in the power to the load 14.

The R.M.S. feedback circuit 22 includes a center-tapped secondary transformer 22a (2.4 to 1 ratio); rectifiers 22b and 22c each (1N3193); variable potentiometer 22d (1K ohms); condenser 22e (140 mfd.) and resistor 22f (1500 ohms).

The settable circuit and the feedback circuit are interconnected by a common point (or lead) F in order to have their signals compared and the difference between them impressed on the points C and D. The value of the feedback voltage is related to the R.M.S. value of the output voltage as compared to the average value of the voltage produced by the settable circuit thereby giving an indication of the actual voltage being delivered which controls the intensity of illumination, if the load consists of incandescent bulbs.

The potentiometer 22d is employed to enable adjustment of the upper limit of voltage to the load by setting maximum value of voltage between the points D and E. It will be appreciated that if there is no voltage difference between C and D that there is no precharge voltage between C and E when the potentiometer is zero. However, at other values of the potentiometer 22d there is a voltage difference between C and D (C is positive with respect to D). To increase the voltage to the load, the voltage between C and D increases causing the voltage H to become more negative with respect to C and hence through the emitter-follower action of transistor 20c causes the voltage at E to become more negative with respect to C, thus increasing the precharge on the capacitor 18.

It will thus be seen with the above circuitry that the settable circuit and feedback circuit together determine the precharge level of the condenser 18 and hence set the time for each half cycle in which the oscillating circuit fires the SCR elements 13a and 13b.

According to the present invention wherein it is desired to protect the SCR elements against sustained overload that may exist for more than a few cycles or for a large overload, there is provided the safety circuit 23 which functions to prevent firing of the SCR elements upon the load current increasing beyond a predetermined value. The safety circuit 23 includes the following elements: current transformer 23a (1 to 600 ratio) connected in the input, full-wave rectifier bridge 23b (all rectifiers 1N3193); transistor 23c (2N408); resistors 23d (270 ohms), 23e (47 ohms), 23f (10K ohms), 23g (5.6K ohms) and 23h (220 ohms); capacitors 23i and 23j (both 40 mfd.), diodes 23k and 23l (both 1N3193) and resistor 23m. (10K ohms). The safety circuit by reason of the values of the elements 23f, 23g, 23i and 23j provides time delay and simultaneous attenuation is achieved by elements 23d and 23e in the application of the voltage from the transformer 23a to the base of the transistor 23c. Under normal operating input voltage conditions, the collector-emitter circuit of the transistor 23c is not conducting. However, upon an increase in the input current beyond a predetermined limit as one and one quarter rated current, the transistor 23c becomes conducting after approximately a ten cycle delay in the embodiment shown caused by the time delay elements and places the base of the transistor 20c at a potential which renders the emitter-collector thereof non-conducting. This produces a substantially zero voltage drop across the transistor 20b as it biases the transistor 20c and hence prevents the precharging of the condenser 18 which in turn prevents the firing of the SCR elements. Momentarily large values of line current, such as five times rated current, bypass the time delay circuit by means of the elements 23d, 23e and 23l and instantaneously causes transistor 23c to conduct, thereby preventing subsequent firing of the SCR elements until the safety circuit again senses normal current.

The circuit of the present invention is primarily designed to control the power to a load consisting of incandescent lamps to thus vary the degree of illumination therefrom. Normally, however, when incandescent lamps are cold they have a small resistance compared to their operating temperature and hence upon turning on the power control of the present invention there would be an instantaneous inrush current through the SCR elements which would damage them. However, according to the present invention the momentary overload safety circuit 24 acts as a current inrush limiting device and is herein shown as an air core inductor but may have that structure disclosed in my above-mentioned patent application. The circuit 24 is inserted in the lead 16 and effectively prevents damage to the SCR elements by first half cycle instantaneous inrush current. Moreover, as a further precaution to prevent damage to the power circuit, the ratings of the SCR elements are preferably much higher than that which would normally be employed. For example, with a power control circuit for controlling 50 amperes SCR's having a rating of 110 amperes may be employed.

To eliminate radio frequency signals generated in the present circuit, there are provided radio frequency interference filters 27 and 28.

It will accordingly be appreciated that there has been disclosed an electric power circuit for controlling the power, by controlling the voltage to a load and particularly where the power circuit employs semiconductor elements. The circuit provides for overcoming variations in characteristics of the semiconductor elements in order to achieve accurate and precise control of the power even with varying ambient conditions that effect the semiconductor elements. Moreover, the present power circuit protects the semiconductor elements against both sustained over current conditions and momentary inrush over current conditions.

Variations and modifications may be made within the scope of the claims and portions of the improvements may be used without others.

I claim:

1. An electrical power control system for controlling the power to a load comprising an input connectible to a source of electrical energy that supplies energy in cycles, an output connectible to the load, semiconductor power controlling means normally non-conducting but responsive to a signal to be rendered conducting and connected to control the power transmitted to the output, signal means connected to the semiconductor means for producing a signal to render the semiconductor means conductive, means connected to the signal means and operating cyclically for producing a voltage which increases at a substantially linear rate for each half cycle to render the signal means signal producing for each cycle but having a normal starting position for each cycle that is incapable of rendering the signal means to be signal producing and means operatively associated with the last-named means for altering the normal starting position of the last-named means.

2. The invention as defined in claim 1 in which the means for altering includes adjustable means for selecting the position to which the starting position is altered.

3. The invention as defined in claim 1 in which the means for altering includes means for sensing the output voltage and varying the position to which the starting position is altered upon deviation of the output voltage from a selected value.

4. An A.C. power control system for controlling the power to a load comprising an input connectible to a source of A.C., an output connectible to the load, semiconductor power controlling means normally non-conducting but responsive to a signal to be rendered conducting and connected to control the power transmitted to the output, signal means connected to the semiconductor means for producing a signal to render the semi-conductor means conductive, means connected to the signal means for producing a voltage which increases for each half cycle at a substantially linear rate to render the signal means signal producing but having a normal starting position for each half cycle that prevents the signal means from producing a signal and means operatively associated with the last-named means for setting the starting half cycle position of the increasing voltage means, said increasing voltage means upon rendering the signal means signal producing for a half cycle maintaining the producing of the signal for the duration of the half cycle.

5. An A.C. power control system adapted to be adjusted to control the amount of power to a load comprising an input connectible to a source of alternating current, an output connectible to the load, semiconductor power controlling means responsive to a signal and connected to control the power transmitted to the output, settable means for producing a predetermined signal indicative of the voltage to be transmitted to the load, oscillator signal means connected to the semiconductor means and the settable means for producing an oscillatory signal of relatively high frequency that is substantially higher than the frequency of the alternating current source to render the semiconductor means conductive, said signal continuing throughout the duration that the semiconductor means conducts to control the set voltage to the load and means for ceasing the oscillatory signal at each zero crossing of the A.C. input.

6. An A.C. power control system adapted to be adjusted to control the voltage to a load comprising an input connectible to a source of A.C., an output connectible to the load, semiconductor power controlling means responsive to a signal and connected to control the power transmitted to the output, settable means for producing a predetermined signal that is indicative of the selected voltage to the load, feedback means for sensing the actual voltage to the load and producing a feedback signal, oscillator means connected to the semiconductor means for producing an oscillatory signal to render the semiconductor means conductive, oscillatory rendering means connected to the oscillator means for increasingly tending for each half cycle to render the oscillating means oscillating but having a normal starting half cycle position that prevents the oscillator means from operating and altering means connected to the settable means and the feedback means for altering the starting half cycle position of the oscillator rendering means to effect oscillation of the oscillator means for that portion of the half cycle that causes the semiconductor means conductive to set the selected voltage to the load.

7. An A.C. power control system adapted to be adjusted to control the voltage to a load comprising an input connectible to a source of A.C., an output connectible to the load, semiconductor power controlling means responsive to a signal and connected to control the power transmitted to the output, settable means for producing a predetermined signal that is indicative of the selected voltage to the load, feedback means for sensing the actual voltage to the load and producing a feedback signal, oscillator means connected to the semiconductor means for producing an oscillatory signal to render the semiconductor means conductive, oscillator rendering means connected to the oscillator means for increasingly tending for each half cycle to render the oscillating means oscillating but having a normal starting half cycle position that prevents the oscillator means from operating, altering means connected to the settable means and the feedback means for altering the starting half cycle position of the oscillator rendering means to effect oscillation of the oscillator means for that portion of the half cycle that causes the semiconductor means conductive to set the desired voltage to the load and means for sensing the value of current to the load and preventing the altering means from altering the starting half cycle position upon a current flowing to the load having a sustained value larger than rated current or a momentarily exceedingly larger value of rated current.

8. In combination with an electrical circuit including at least one semiconductor element having an anode, cathode and gate, said element being normally non-conducting between the anode and cathode but being rendered conducting from the anode to the cathode upon application of a firing signal between the gate and cathode; a firing signal producing circuit comprising oscillatory signal means for producing an oscillatory signal of relatively high frequency and strength to render the element conducting, said oscillatory signal means normally being non-signal producing but producing the oscillatory signal upon receipt of an activating signal thereto, means connecting the signal means to the gate and cathode of the element and means for applying an activating signal to the oscillatory signal means, the frequency of the repetition of the activating signal being substantially less than the frequency of the oscillatory signal.

9. In combination with an electrical circuit including at least one semiconductor element having an anode, cathode and gate, said element being normally non-conducting between the anode and cathode but being rendered conducting from the anode to the cathode upon application of a firing signal between the gate and cathode; a firing signal producing circuit comprising oscillatory signal means for producing an oscillatory signal of relatively high frequency and strength to render the element conducting and maintaining said signal substantially throughout the duration of conduction of the element, said oscillatory signal means normally being non-signal producing but producing an oscillatory signal upon receipt of an activating signal thereto, means connecting the signal means to the gate and cathode of the element and means for applying an activating signal to the oscillatory signal means, the frequency of the repetition of the activating signal being substantially less than the frequency of the oscillatory signal.

10. In combination with an electrical circuit including at least one semiconductor element having an anode, cathode and gate, said element being normally non-conducting between the anode and cathode but being rendered conducting from the anode to the cathode upon application of a firing signal between the gate and cathode; a firing signal producing circuit comprising oscillatory signal means for producing an oscillatory signal of relatively high frequency having a peak value sufficient to render the element conducting, said oscillatory signal means normally being non-signal producing but producing an oscillatory signal upon receipt of an activating signal thereto, means connecting the signal means to the gate and cathode of the element and means for applying an activating signal to the oscillatory signal means, the frequency of the repetition of the activating signal being substantially less than the frequency of the oscillatory signal.

11. In combination with an electrical circuit including at least one semiconductor element having an anode, cathode and gate, said element being normally non-conducting between the anode and cathode but being rendered conducting from the anode to the cathode upon application of a firing signal between the gate and cathode; a firing signal producing circuit comprising oscillatory signal means including a transformer having a secondary winding for producing an oscillatory signal of relatively high frequency and strength to render the element conducting, said oscillatory signal means normally being non-signal producing but producing an oscillatory signal upon receipt of an activating signal thereto, means connecting the secondary winding of the transformer of the signal means to the gate and cathode of the element and means for applying an activating signal to the oscillatory signal means, the frequency of the repetition of the activating signal being substantially less than the frequency of the oscillatory signal.

12. In combination with an electrical circuit including at least one semiconductor element having an anode, cathode and gate, said element being normally non-conducting between the anode and cathode but being rendered conducting from the anode to the cathode upon application of a firing signal between the gate and cathode; a firing signal producing circuit comprising oscillatory signal means including a transformer having a secondary winding for producing an oscillatory signal of relatively high frequency in the neighborhood of 10,000 cycles per second and strength to render the element conducting and maintaining said signal substantially throughout the duration of conduction of the element, said oscillatory signal means normally being non-signal producing but producing an oscillatory signal upon receipt of an activating signal thereto, means connecting the secondary winding of the transformer of the signal means to the gate and cathode of the element and means for applying an activating signal to the oscillatory signal means, the frequency of the repetition of the activating signal being substantially less than the frequency of the oscillatory signal.

References Cited by the Examiner

UNITED STATES PATENTS

| | | | |
|---|---|---|---|
| 2,942,174 | 6/1960 | Harrison | 317—33 X |
| 2,976,431 | 3/1961 | Richards | 307—88.5 |
| 3,018,416 | 1/1962 | Karlicek | 317—33 X |
| 3,040,239 | 6/1962 | Walker | 323—24 |
| 3,047,789 | 7/1962 | Lowry | 323—22 |
| 3,070,739 | 12/1962 | Hansen et al. | 323—22 |
| 3,152,296 | 10/1964 | Meszaros | 323—22 |
| 3,170,085 | 2/1965 | Genuit | 315—227 |
| 3,174,107 | 3/1965 | Quackenbush | 331—71 |

LLOYD McCOLLUM, *Primary Examiner.*

G. P. HASS, K. D. MOORE, D. L. RAE,
*Assistant Examiners.*